(12) United States Patent
Beckmann

(10) Patent No.: US 6,558,604 B1
(45) Date of Patent: May 6, 2003

(54) PREFORM AND METHOD FOR ITS FABRICATION

(75) Inventor: Friedhelm Beckmann, Hiddenhausen (DE)

(73) Assignee: Moeller Plast GmbH, Bielefeld (DE)

( * ) Notice: Subject to any disclaimer, the term of this patent is extended or adjusted under 35 U.S.C. 154(b) by 0 days.

(21) Appl. No.: 09/369,721

(22) Filed: Aug. 6, 1999

Related U.S. Application Data

(63) Continuation of application No. PCT/DE98/00013, filed on Jan. 7, 1998.

(30) Foreign Application Priority Data

Feb. 6, 1997 (DE) .......................................... 097 04 383

(51) Int. Cl.⁷ ................................................. B29D 9/00
(52) U.S. Cl. .................. 264/319; 264/330; 264/331.11
(58) Field of Search ................................ 264/319, 330, 264/331.11

(56) References Cited

U.S. PATENT DOCUMENTS 5,037,690 A * 8/1991 Va Der Kooy .............. 428/116
5,942,321 A * 8/1999 Romesberg et al. ...... 428/300.7

FOREIGN PATENT DOCUMENTS

GB 2096195 * 10/1982

* cited by examiner

Primary Examiner—Elizabeth M. Cole
(74) Attorney, Agent, or Firm—Laurence A. Greenberg; Werner H. Stemer; Gregory L. Maybeck

(57) ABSTRACT

A cast part, for example, for use as an internal coating of a vehicle. The cast part has a bearing layer, which is compressed and made of natural fibers bound together by a binding agent. A decorative layer is disposed on an upper surface of the bearing layer and on a lower surface of the bearing layer, a sealing layer, on which functional elements are molded in the form of fixing clips and reinforcing ribs is disposed. The case part is made according to a process consisting in compressing a natural fiber matting containing a binding agent into the bearing layer having either a plane surface or a contour and, in a second forming step, shaping the decorative material located in a upper half of a forming tool as well as a thermoplastic material applied to a lower half of the forming tool for forming the sealing layer and the functional element formed therefrom. The cast part is highly resistant with undiminished aesthetic and tactile features of the decorative material, is not moisture-sensitive and does not smell.

7 Claims, 1 Drawing Sheet

PREFORM AND METHOD FOR ITS FABRICATION

CROSS-REFERENCE TO RELATED APPLICATION

This is a continuation of copending International Application PCT/DE98/00013, filed Jan. 7, 1998, which designated the United States.

BACKGROUND OF THE INVENTION

Field of the Invention

The invention concerns a method for fabricating preforms, in particular preforms for power-driven vehicles. The preforms are formed of a natural fiber mat forming a supporting layer with a decorative layer on its upper surface and functional elements on its lower surface. The layers are combined with each other and brought into the desired shape through a second pressing in a form tool. The invention also relates to a method for fabricating the preforms.

In the manufacture of preforms from natural fibers such as, for example, hemp, jute, flax or sisal, fiber mats are used which are interspersed with a thermoplastic synthetic material as a binding agent, or have a binding agent of this kind adhering to their fibers. A decorative material, for example leather, a synthetic leather, a textile fabric, etc., is attached to the upper, essentially visible surface of the preform for reasons of aesthetics and to improve its tactile qualities. The fabrication of the preform is carried out by pressing together and shaping the natural fiber mat with the decorative material in a form tool at melting temperatures of the thermoplastic binding agent. In this process the natural fiber mat is compressed to the extent that it acquires the mechanical properties required of the preform. In addition, however, the decorative material to be combined with the fiber mat is also compressed to such an extent that its tactile and aesthetic effect is impaired. On the other hand, application of too low a mold pressure leads to insufficient compression of the natural fiber mat with the result that its strength characteristics are inadequate.

A further disadvantage of preforms fabricated from natural fibers in the case, for example, of inner coverings for power-driven vehicles is that the natural fibers can absorb moisture and the properties of the preform can be negatively influenced as a result. Apart from this, the natural fibers release unpleasant and in many cases unacceptable odors.

A preform of the above kind made from composite fiber mats for covering the inside of power-driven vehicles is already known from Published, European Patent Application EP 0 730 947 A2, together with a method for its fabrication. This preform has a decorative layer of decorative material on the visible surfaces while at the rear side functional parts, e.g. fixing elements or reinforcing ribs, connected with island-like areas are molded on through a second injection or a second pressing. These covering components are also fabricated in a single pressing process with the disadvantages described above, and the danger also exists of moisture uptake and unpleasant odors.

SUMMARY OF THE INVENTION

It is accordingly an object of the invention to provide a preform and a method for its fabrication that overcome the above-mentioned disadvantages of the prior art devices and methods of this general type, which preform has a high practical value through its good mechanical properties, low tendency to emit odors, exclusion of moisture uptake and an unrestricted tactile and aesthetic effect of the decorative material.

With the foregoing and other objects in view there is provided, in accordance with the invention, a method for fabricating preforms, including preforms to be used in power-driven vehicles, which includes:

providing a natural fiber mat intermixed with a binding agent;

compressing the natural fiber mat at a temperature near a melting temperature of the binding agent by use of a mold pressure in accordance with a desired thickness and strength resulting in a supporting layer having an upper surface and a lower surface; and pressing on a molten binding agent to the lower surface of the supporting layer for forming a sealing layer at the lower surface and pressing on a decorative layer to the upper surface of the supporting layer via a form tool set at a lower pressure than used in the compressing step.

The object is achieved according to the invention with a method in which first of all the natural fiber mat provided with a binding agent is compressed in the region of the binding agent melting temperature by a mold pressure appropriate to the desired strength characteristics and thickness, and the supporting layer of the preform thus obtained is then combined in a form tool at a lower pressure through a second pressing at its lower surface with a molten binding agent forming a sealing layer, and through a second pressing at its upper surface with the decorative layer.

By this method it is possible to fabricate a preform which has good strength characteristics, whose decorative layer has unrestricted tactile and aesthetic qualities, and which as a result of the one-piece molded-on sealing layer prevents the uptake of moisture and release of odors by the natural fibers.

The method according to the invention is also characterized in that the natural fiber mat is either compressed to a flat-surfaced supporting layer to be molded in a later process step, or is compressed immediately to a supporting layer corresponding with the contour of the preform.

According to a further feature of the invention, reinforcing ribs and functional elements are simultaneously molded on during the second pressing for the sealing layer. The binding agent for the sealing layer and the molded on functional elements or ribs corresponds to or is compatible with that used for binding the natural fibers. As a binding agent, thermoplastic synthetic material is used which is applied to the lower half of the form tool as a molten mass through injection molding or by extrusion.

Other features which are considered as characteristic for the invention are set forth in the appended claims.

Although the invention is illustrated and described herein as embodied in a preform and a method for its fabrication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
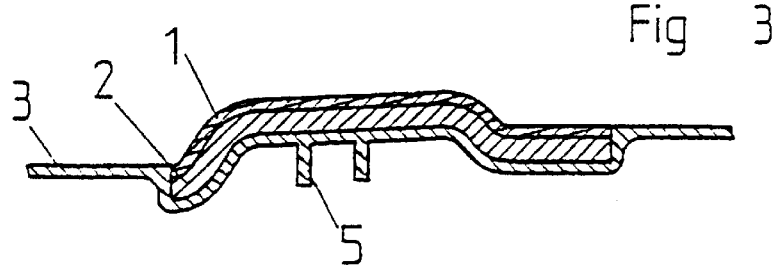
FIG. 3 is a sectional view of the sheet-like preform with the decorative layer completely covering the natural fiber area and the sealing layer extending laterally beyond this area.
Figure 4:
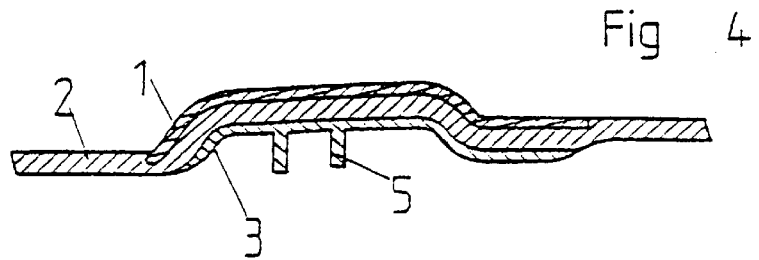
FIG. 4 is a sectional view of the sheet-like preform in which only oppositely located partial areas of the supporting layer of a natural fiber mat are provided with the sealing layer.

In all the figures of the drawing, sub-features and integral parts that correspond to one another bear the same reference symbol in each case. Referring now to the figures of the drawing in detail and first, particularly, to FIG. 1 thereof, there is shown a sheet-like preform which can, for example, be used as a component for an internal covering of power-driven vehicles. The preform includes a supporting layer 2 made of natural fibers such as flax, jute, hemp, sisal and others, or a combination of such natural materials, which supporting layer 2 is impregnated or interspersed with a binding agent, preferably a thermoplastic synthetic material. The sheet-like preform is shaped to a defined contour and in order to improve the aesthetic and tactile qualities is covered on an upper, visible side, with a permanently fixed decorative layer 1 which can consist of leather, textile fabric or a similar suitable decorative material. The decorative layer 1 can either completely cover the basic supporting body of the sheet-like preform (i.e. the supporting layer 2 held together by the binding agent), according to FIGS. 1, 2 and 3, or, as shown in FIG. 4, can be provided only in those partial areas of the surface of the supporting layer 2 which are visible or which serve a decorative purpose for other reasons.

Figure 1:
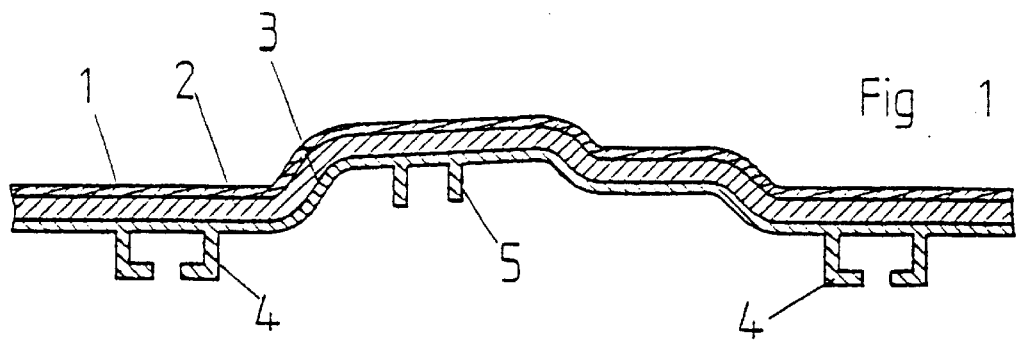
FIG. 1 is a diagrammatic, sectional view of a sheet-like preform fabricated on a basis of natural fibers, an upper surface of the preform is completely covered with a decorative layer and a lower surface of the preform is completely covered by a sealing layer with molded-on functional elements and reinforcing ribs.
Figure 2:
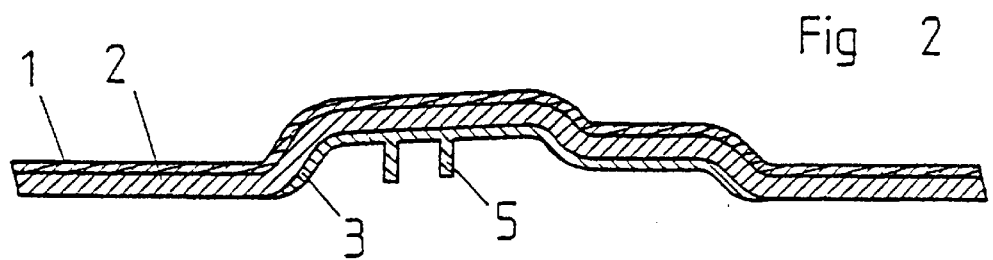
FIG. 2 is a sectional view of the sheet-like preform according to FIG. 1, however with the sealing layer covering only a partial area.

At an underside of the sheet-like preform, e.g. the non-visible side of a door covering, a sealing layer 3 is provided firmly bound to the supporting layer 2 of natural fiber. The sealing layer 3 consists of the same material as or a compatible material to the binding agent of the supporting layer 2, in this case a thermoplastic synthetic material. The sealing layer 3 can either cover the supporting layer 2 completely, as shown in FIGS. 1 and 3, or alternatively cover only partial areas of the natural fiber to the outside, as illustrated in FIGS. 2 and 4. FIG. 3 shows a further special case insofar as the supporting layer 2 is encapsulated between the decorative layer 1 and the sealing layer 3 and the sealing layer 3 is extended beyond the supporting layer 2, e.g. for fixing purposes.

Whereas the decorative layer 1 serves in the first place solely for the visual and tactile configuration of the visible surfaces of the preform, the sealing layer 3 essentially serves the function of protecting against moisture, i.e. of preventing water from penetrating the natural fibers of the supporting layer 2, especially in places which are not only exposed to humidity but are also inaccessible such as the inside of a door covering. However, the sealing layer 3 also acts as a seal against odors and serves at the same time as a fixing panel for a molding on of fixtures and reinforcements and other functional elements. Naturally it is possible through the use of a suitable material that the decorative layer 1 also acts to reduce odors and to protect the natural fiber supporting layer 2 from moisture.

Fabrication of the preform examples described in FIGS. 1 to 4 proceeds such that a natural fiber mat formed from natural fibers and bound with a thermoplastic synthetic material is first heated to a temperature corresponding to the melting temperature of the thermoplastic binding agent and is then pressed together to a flat-surfaced panel in order to achieve the desired mechanical properties of the preform. It is also basically possible, however, to press the natural fiber mat immediately to the final finished contour of the preform. In this case the preformed supporting layer 2 formed in this way is cut at the same time.

In a further process step with open or partly open form tool whose internal contour corresponds to that of the preform to be fabricated, a layer of thermoplastic synthetic material corresponding to the binding agent used for binding the natural fibers in the supporting layer 2 is applied through injection molding to the lower half of the form tool and the material for forming the decorative layer 1 is inserted and fixed in the upper half of the tool. Insertion of the thermoplastic synthetic material and the decorative material in the form tool is carried out according to the size of the area to be covered, either over the entire contour surface of the upper and lower halves of the form tool or only in those specific partial areas which must be covered. For fabrication of the preform shown in FIG. 3 the pressed together supporting layer 2 and the decorative material take up only a limited section of the form tool whereas the thermoplastic synthetic material for the sealing layer 3 covers the lower half of the form tool completely so that the natural fibers are completely encapsulated and, in addition, the sealing layer 3 extends beyond the lateral edges of the supporting layer 2 and the decorative layer 1.

In the following process step the already pressed supporting layer 2 with its adequate strength characteristics is laid in the form tool and while the thermoplastic synthetic material is still in the molten state a mold pressure lower than the pressure used for pressing the natural fiber mat is applied in order to mold the preform and simultaneously to create the permanent binding of the decorative material and the sealing material with the compressed natural fiber mat. During the second molding step in the form tool it is also possible to integrate with the sealing layer 3, functional elements, namely fastening clips 4 or reinforcing ribs 5, with the sealing layer 3 which in this case also serves as a retaining panel.

The lower pressure exerted on the decorative material during this process step prevents an impairment of the aesthetic and tactile qualities of the decorative layer 1. Even so, the separate pressing of the natural fiber mat enables adequately high strength characteristics to be achieved for the preform. The sealing layer 3, which fulfills the three functions of preventing the uptake of moisture, sealing against odors and acting as a base panel for fixing the functional elements 4, 5, can be intrinsically colored or can be provided with a surface structure in order to effect an optically appealing appearance for the lower surface of the preform should this be visible.

I claim:

1. A method for fabricating preforms, which comprises:
providing a natural fiber mat intermixed with a binding agent;
compressing the natural fiber mat at a temperature near a melting temperature of the binding agent by use of a mold pressure in accordance with a desired thickness and strength resulting in a supporting layer having an upper surface and a lower surface; and pressing on a molten binding agent to the lower surface of the supporting layer for forming a sealing layer at the lower surface and pressing on a decorative layer to the upper surface of the supporting layer via a form tool set at a lower pressure than used in the compressing step.

2. The method according to claim 1, which comprises pressing the natural fiber mat into a flat-surfaced supporting layer and forming contours in the flat-surfaced supporting layer jointly during the step of pressing on the decorative layer and the sealing layer.

3. The method according to claim 1, which comprises:

compressing the natural fiber mat into the supporting layer with a contour of a finished preform;

cutting to size the supporting layer; and performing subsequently the step of pressing on the sealing layer and the decorative layer in a separate process step.

4. The method according to claim 1, which comprises forming at least one of functional elements and reinforcing ribs from the sealing layer when the sealing layer is formed.

5. The method according to claim 1, which comprises:

applying a film of a substance selected from the group consisting of the binding agent of the supporting layer and a thermoplastic material compatible with the binding agent to a lower half of the form tool in an open position for molding on the sealing layer; and inserting a decorative material in an upper half of the form tool in the open position for molding on the decorative layer.

6. The method according to claim 5, which comprises applying the film of the substance for the sealing layer to the lower half of the form tool through one of injection molding and extrusion.

7. The method according to claim 1, which comprises applying the decorative material and the film of the substance to partial areas of the upper half and the lower half, respectively, of the form tool and molding onto the supporting layer the decorative material and the film of the substance in corresponding partial areas.

* * * * *

UNITED STATES PATENT AND TRADEMARK OFFICE
CERTIFICATE OF CORRECTION

PATENT NO. : 6,558,604 B1
DATED : May 6, 2003
INVENTOR(S) : Friedhelm Beckmann

It is certified that error appears in the above-identified patent and that said Letters Patent is hereby corrected as shown below:

<u>Title page,</u>
Item [30], should read as follows:

-- FOREIGN APPLICATION PRIORITY DATA

[30] Feb. 6, 1997     (DE)     ………….. 197 04 383 --

Signed and Sealed this

Second Day of September, 2003

JAMES E. ROGAN
*Director of the United States Patent and Trademark Office*